US012784596B2

(12) United States Patent
Kawanishi et al.

(10) Patent No.: US 12,784,596 B2
(45) Date of Patent: Nov. 3, 2026

(54) DRIVER ASSISTANCE SYSTEM, DRIVER ASSISTANCE METHOD, AND NON-TRANSITORY COMPUTER-READABLE STORAGE MEDIUM

(71) Applicant: TOYOTA JIDOSHA KABUSHIKI KAISHA, Toyota Aichi-ken (JP)

(72) Inventors: Ray Kawanishi, Taito-ku Tokyo-to (JP); Katsuhiro Sakai, Kawasaki Kanagawa-ken (JP); Taisuke Sugaiwa, Chofu Tokyo-to (JP); Hiroshi Nakamura, Chofu Tokyo-to (JP); Naoki Nagasaka, Nagakute Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/201,304

(22) Filed: May 24, 2023

(65) Prior Publication Data

US 2023/0410658 A1 Dec. 21, 2023

(30) Foreign Application Priority Data

Jun. 17, 2022 (JP) ................................. 2022-098031

(51) Int. Cl.
*G08G 1/16* (2006.01)
*B60W 30/09* (2012.01)
(Continued)

(52) U.S. Cl.
CPC ............. *G08G 1/166* (2013.01); *B60W 30/09* (2013.01); *B60W 60/0015* (2020.02);
(Continued)

(58) Field of Classification Search
CPC .. G08G 1/166; B60W 30/09; B60W 60/0015; B60W 2555/20; B60W 2554/4029;
(Continued)

(56) References Cited

U.S. PATENT DOCUMENTS

| | | | | |
|---|---|---|---|---|
| 10,112,528 B1* | 10/2018 | Mazuir | .................. | B60Q 5/006 |
| 2013/0179382 A1* | 7/2013 | Fritsch | .................. | G08G 1/161 706/46 |
| 2014/0139368 A1 | 5/2014 | Takaki | | |
| 2014/0244111 A1* | 8/2014 | Gross | .................. | B60W 50/14 701/1 |
| 2015/0344030 A1* | 12/2015 | Damerow | ............ | G06V 20/588 701/1 |

(Continued)

FOREIGN PATENT DOCUMENTS

| | | |
|---|---|---|
| JP | 2006-151114 A | 6/2006 |
| JP | 2012-192878 A | 10/2012 |

(Continued)

*Primary Examiner* — Jelani A Smith
*Assistant Examiner* — Dana D Ivey
(74) *Attorney, Agent, or Firm* — Dinsmore & Shohl LLP

(57) ABSTRACT

The driver assistance system of the present disclosure is configured to execute processing comprising following four processes. The first process is to extract risk target information related to a risk target that causes a collision risk to a vehicle from information related to a peripheral situation of the vehicle. The second process is to obtain natural phenomenon information related to a natural phenomenon that affects the risk target. The third process is to determine a risk parameter that quantifies the collision risk based on the risk target information and the natural phenomenon information. The fourth process is to determine a manipulated variable of an actuator for controlling movement of the vehicle to reduce the collision risk based on the risk parameter.

9 Claims, 13 Drawing Sheets

(51) Int. Cl.
*B60W 60/00* (2020.01)
*B60W 30/095* (2012.01)
*B60W 30/12* (2020.01)

(52) U.S. Cl.
CPC ..... *B60W 30/0953* (2013.01); *B60W 30/0956* (2013.01); *B60W 30/12* (2013.01); *B60W 60/0027* (2020.02); *B60W 2554/4029* (2020.02); *B60W 2554/4045* (2020.02); *B60W 2554/4048* (2020.02); *B60W 2555/20* (2020.02); *B60W 2710/18* (2013.01); *B60W 2754/20* (2020.02)

(58) Field of Classification Search
CPC . B60W 2554/4045; B60W 2554/4048; B60W 2754/20; B60W 30/0956; B60W 30/12; B60W 30/0953; B60W 60/0027; B60W 2710/18
USPC ............................................................ 701/23
See application file for complete search history.

(56) References Cited

U.S. PATENT DOCUMENTS

| | | | | |
|---|---|---|---|---|
| 2015/0345964 | A1 | 12/2015 | Oooka et al. | |
| 2016/0039411 | A1* | 2/2016 | Park | G01S 13/931 701/70 |
| 2017/0327110 | A1 | 11/2017 | Inoue et al. | |
| 2018/0148053 | A1* | 5/2018 | Lee | G06V 10/26 |
| 2019/0272433 | A1* | 9/2019 | Yu | G06V 20/56 |
| 2020/0355511 | A1* | 11/2020 | Shimizu | G01C 21/3811 |

FOREIGN PATENT DOCUMENTS

| | | | | |
|---|---|---|---|---|
| JP | 2014-102703 | A | | 6/2014 |
| JP | 2015-228090 | A | | 12/2015 |
| JP | 2017-206040 | A | | 11/2017 |
| JP | 2020160878 | A | * | 10/2020 |
| JP | 2021-089698 | A | | 6/2021 |
| JP | 2021-157427 | A | | 10/2021 |

* cited by examiner

DRIVER ASSISTANCE SYSTEM, DRIVER ASSISTANCE METHOD, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2022-098031, filed Jun. 17, 2022, the contents of which application are incorporated herein by reference in their entirety.

BACKGROUND

Field

The present disclosure relates to a driver assistance system, a driver assistance method, and a non-transitory computer-readable storage medium storing a driver assistance program.

Background Art

JP2021-157427A discloses a prior art for preventing an ego-vehicle from taking an avoidance action by sudden deceleration with respect to a pedestrian crossing a crosswalk hastily in a scene in which the ego-vehicle approaches the crosswalk. In the prior art, the possibility of the pedestrian crossing the crosswalk is calculated, and when the possibility is equal to or greater than a predetermined value, the avoidance preparation operation is executed. Information such as the face direction of the pedestrian, the number of pedestrians, the type of traffic light, and the size of the intersection is used to calculate the possibility of the pedestrian crossing the crosswalk. For example, when the face direction of the pedestrian is not looking in the direction of the ego-vehicle, the possibility of the pedestrian crossing the crosswalk is calculated to be a higher value than when the face direction of the pedestrian is looking in the direction of the ego-vehicle.

In addition to the above-described JP2021-157427 A, JP2014-102703A and JP2017-206040A can be exemplified as documents showing the technical level of the technical field related to the present disclosure.

SUMMARY

When the avoidance preparation operation for avoiding the collision with the pedestrian is excessively performed, the driver feels annoyed. On the other hand, in some situations, the driver may feel anxious because the avoidance preparation operation is not performed. Therefore, it is desirable that the avoidance preparation operation is appropriately performed. However, in the above-described prior art, the influence of a natural phenomenon such as weather or backlight that occurs when the ego-vehicle is viewed from the pedestrian on the collision risk is not considered.

The present disclosure has been made in view of the above-described problem, and an object of the present disclosure is to provide a technique capable of reducing a collision risk caused by a target existing in front of a vehicle while suppressing annoyance and anxiety given to a driver.

In order to achieve the above objective, the present disclosure provides a driver assistance system. The driver assistance system of the present disclosure comprises at least one processor and a program memory communicatively coupled to the at least one processor and storing a plurality of executable instructions. The plurality of instructions is configured to cause the at least one processor to execute the following first to fourth processes. The first process is a process of extracting risk target information related to a risk target that causes a collision risk to an ego-vehicle from information related to a peripheral situation of the ego-vehicle. The second process is a process of obtaining natural phenomenon information related to a natural phenomenon that affects the risk target. The third process is a process of determining a risk parameter that quantifies the collision risk based on the risk target information extracted from the information related to the peripheral situation of the ego-vehicle in the first process and the natural phenomenon information obtained in the second process. The fourth process is a process of determining, based on the risk parameter determined in the third process, a manipulated variable of an actuator for controlling the movement of the ego-vehicle so as to reduce the collision risk.

In order to achieve the above objective, the present disclosure provides a driver assistance method. The driver assistance method according to the present disclosure comprises the following first to fourth steps. The first step is to extract risk target information related to a risk target that causes a collision risk to an ego-vehicle from information related to a peripheral situation of the ego-vehicle The second step is to obtain natural phenomenon information related to a natural phenomenon that affects the risk target. The third step is to determine a risk parameter that quantifies the collision risk based on the risk target information extracted from the information related to the peripheral situation of the ego-vehicle in the first step and the natural phenomenon information obtained in the second step. Then, the fourth step is to determine, based on the risk parameter determined in the third step, a manipulated variable of an actuator for controlling the movement of the ego-vehicle so as to reduce the collision risk.

In order to achieve the above object, the present disclosure provides a driver assistance program. The driver assistance program according to the present disclosure is configured to cause a computer to execute the following first to fourth processes. The first process is a process of extracting risk target information related to a risk target that causes a collision risk to an ego-vehicle from information related to a peripheral situation of the ego-vehicle. The second process is a process of obtaining natural phenomenon information related to a natural phenomenon that affects the risk target. The third process is a process of determining a risk parameter that quantifies the collision risk based on the risk target information extracted from the information related to the peripheral situation of the ego-vehicle in the first process and the natural phenomenon information obtained in the second process. Then, the fourth process is a process of determining, based on the risk parameter determined in the third process, a manipulated variable of an actuator for controlling the movement of the ego-vehicle so as to reduce the collision risk. The driver assistance program of the present disclosure may be recorded in a non-transitory computer-readable storage medium.

According to the driver assistance system, the driver assistance method, and the driver assistance program of the present disclosure, since the risk parameter is determined based on not only the risk target information but also the natural phenomenon information, it is possible to make the intervention in the actuator operation performed to reduce the collision risk appropriate. As a result, it is possible to reduce the collision risk caused by the target existing in front of the ego-vehicle while suppressing annoyance and anxiety given to the driver.

In the driver assistance system, the driver assistance method, and the driver assistance program according to the present disclosure, the extracting the risk target information may comprise extracting information related to an explicit risk target that is present in front of the ego-vehicle and has a possibility of colliding with the ego-vehicle. By extracting the information related to the explicit risk target as the risk target information, it is possible to reduce an explicit collision risk such as a pedestrian who may run out onto the road. The extracting the risk target information may comprise extracting information related to a potential risk target that is present in front of the vehicle and creates a blind spot for the ego-vehicle. By extracting the information related to the potential risk target as the risk target information, it is possible to reduce a potential collision risk in the blind spot for the vehicle.

In the driver assistance system, the driver assistance method, and the driver assistance program according to the present disclosure, the obtaining the natural phenomenon information may comprise obtaining information related to weather. Whether the weather is good or bad affects the visibility of the ego-vehicle from the other party. For example, the visibility deteriorates in rainy weather, snowy weather, or foggy weather. By determining the risk parameter in consideration of the weather, it is possible to reduce the collision risk due to the influence of the weather. The obtaining the natural phenomenon information may comprise obtaining information related to backlight that occurs when the vehicle is viewed from the risk target. The backlight that occurs when the ego-vehicle is viewed from the other party affects the visibility of the ego-vehicle from the other party. By determining the risk parameter in consideration of the backlight, it is possible to reduce the collision risk due to the influence of the backlight. When the risk target is the explicit risk target, the other party means the explicit risk target itself. When the risk target is the potential risk target, the other party means a virtual object hidden in the blind spot of the potential risk target.

As described above, according to the technique of the present disclosure, by determining the risk parameter based on not only the risk target information but also the natural phenomenon information, it is possible to make the intervention in the actuator operation performed to reduce the collision risk appropriate. As a result, it is possible to reduce the collision risk caused by the target existing in front of the ego-vehicle while suppressing annoyance and anxiety given to the driver.

DETAILED DESCRIPTION

Figure 1:
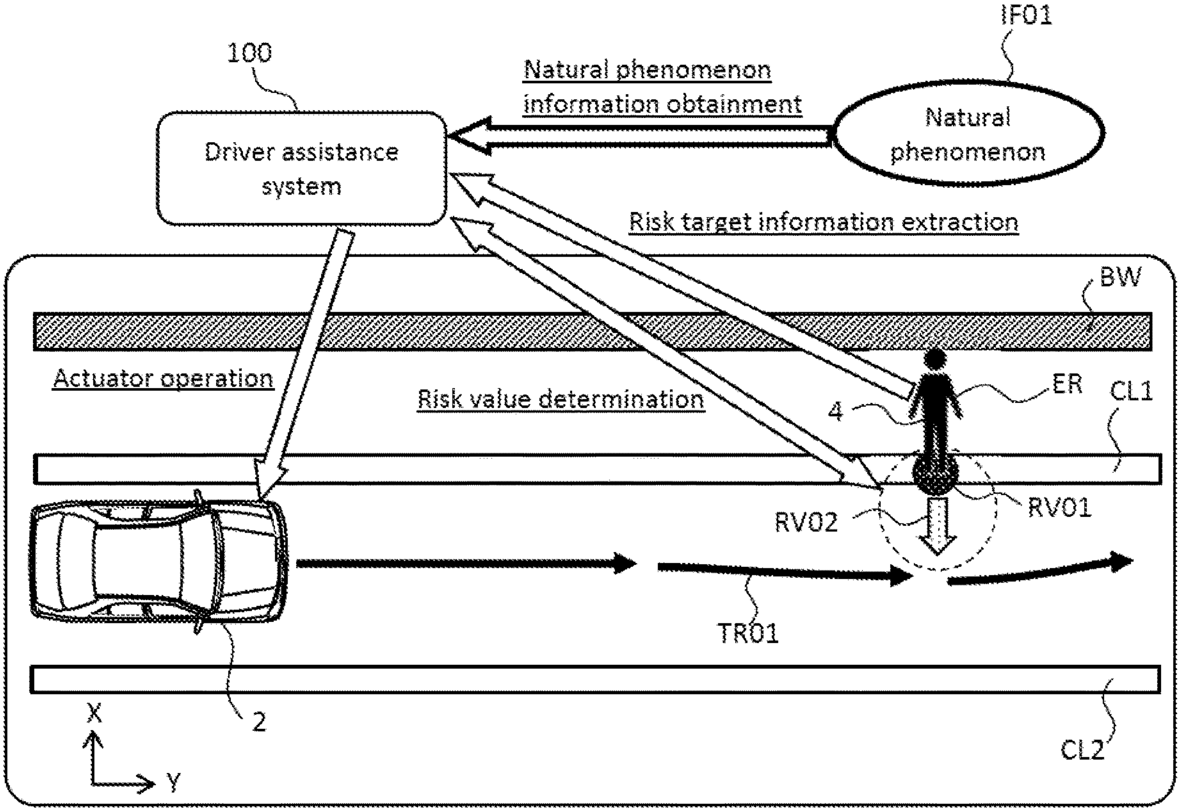
FIG. 1 is a conceptual diagram for explaining explicit risk avoidance control in driver assistance control by a driver assistance system according to an embodiment of the present disclosure.

Hereinafter, an embodiment of the present disclosure will be described with reference to the drawings.

1. Outline of Driver Assistance System

1-1. Outline of Driver Assistance Control

The driver assistance system according to the present embodiment executes driver assistance control for assisting driving of a vehicle so as to avoid a risk that the vehicle collides with an object in front of the vehicle. The collision risk to be avoided by the vehicle includes an explicit risk and a potential risk. The explicit risk is a collision risk explicitly present, such as a pedestrian who may run out ono the road. The potential risk is a collision risk potentially present in a blind spot for the vehicle. The driver assistance system according to the present embodiment sets both of these two types of collision risks as avoidance targets.

In the driver assistance control, a risk parameter that quantifies the collision risk is used. The risk parameter used in the present embodiment is represented by a vector from a target object to be avoided from collision and its accuracy. The vector is the predicted moving direction and distance of the target object, and the accuracy is the prediction accuracy. Hereinafter, the vector having the prediction accuracy as a risk parameter is referred to as a predicted risk vector. The predicted risk vector is defined in accordance with information related to the target object, such as the position of the target object to be avoid from collision, the distance of the vehicle from the target object, the type of the target object, the size of the target object, and the displacement speed of the target object.

When the collision risk is an explicit risk, the target object is a target itself that causes the explicit risk (hereinafter, this target is referred to as an explicit risk target). In this case, the predicted risk vector is determined based on the information related to the explicit risk target, and the predicted risk vector is associated with the explicit risk target. When the collision risk is a potential risk, the target object is a virtual object that is hidden in a blind spot of a target that causes the potential risk (hereinafter, this target is referred to as a potential risk target). In this case, virtual information associated with the potential risk target is given as information related to the target object for defining the predicted risk vector. Therefore, when the collision risk is a potential risk, the predicted risk vector is associated with the potential risk target.

As described above, the predicted risk vector related to the driver assistance control is determined based on the information related to the explicit risk target or the potential risk target. Hereinafter, this information is referred to as risk target information. The risk target information is information related to a risk target that causes a collision risk to the vehicle, and is extracted from peripheral situation information obtained by an autonomous sensor mounted on the vehicle. However, in the driver assistance system according to the present embodiment, the information used for determining the predicted risk vector is not only the risk target information.

The driver assistance system according to the present embodiment uses information on a natural phenomenon that affects a risk target to determine a risk value. The collision risk is not determined by the risk target itself but is affected by natural phenomena surrounding the risk target. Hereinafter, the information related to the natural phenomenon affecting the risk target is referred to as natural phenomenon information. It can be said that the risk target information is information for determining basic values of the predicted risk vector and the prediction accuracy, and the natural phenomenon information is information for providing a correction term or a correction coefficient for correcting the basic values.

In the driver assistance control, vehicle control for operating the vehicle so as to avoid the collision risk is performed. The vehicle control for risk avoidance includes at least one of braking control for braking the vehicle by operating a braking actuator and steering control for steering the vehicle by operating a steering actuator. The risk value described above, and more particularly the risk potential field, which is the distribution of the risk value, is used to determine a manipulated variable of each actuator.

Hereinafter, the driver assistance control performed for avoiding the potential risk is referred to as potential risk avoidance control, and the driver assistance control performed for avoiding the explicit risk is referred to as explicit risk avoidance control. In the next section, each of the explicit risk avoidance control and the potential risk avoidance control will be described in more detail.

1-2. Explicit Risk Avoidance Control

Figure 2:
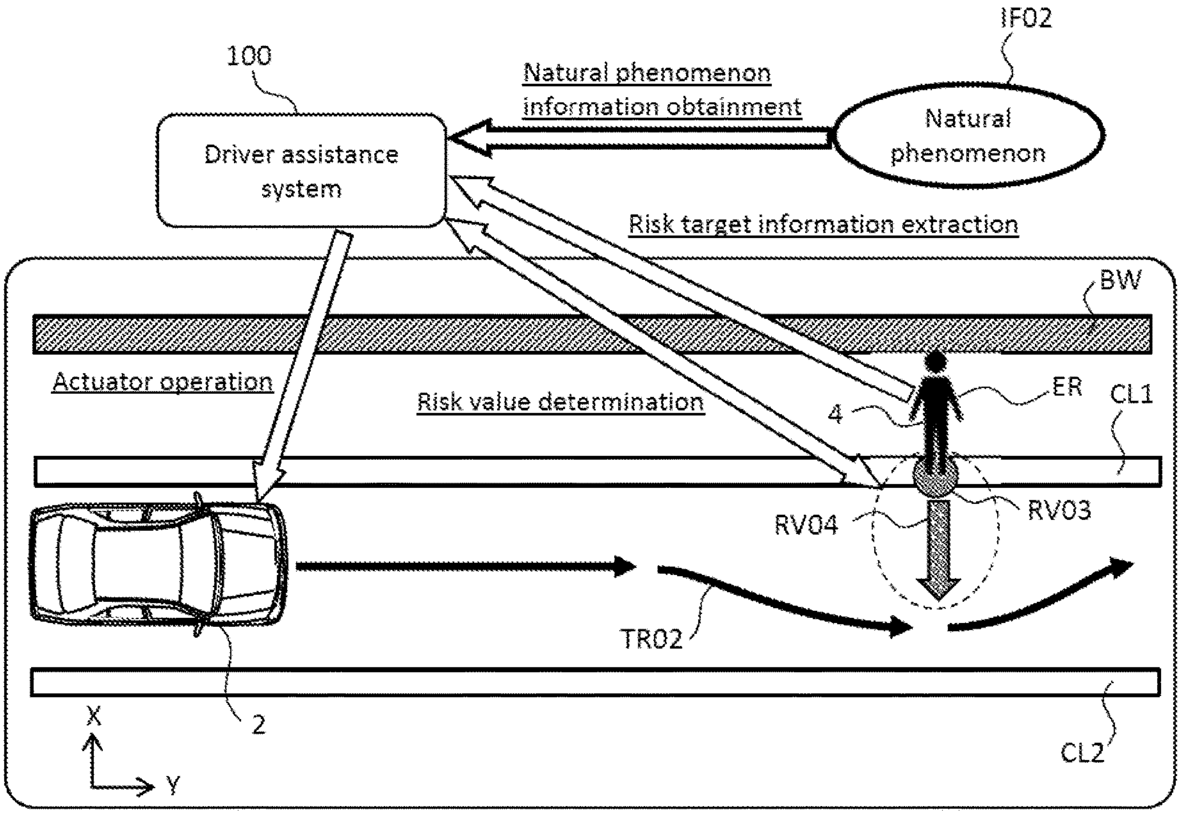
FIG. 2 is a conceptual diagram for explaining the explicit risk avoidance control in the driver assistance control by the driver assistance system according to the embodiment of the present disclosure.

FIGS. 1 and 2 are conceptual diagrams for explaining the explicit risk avoidance control by the driver assistance system 100 according to the present embodiment. FIGS. 1 and 2 illustrate a state in a which vehicle 2 is traveling in a traveling lane defined by two compartment lines CL1 and CL2. A roadside zone is provided between the left compartment line CL1 and the block wall BW outside the compartment line CL1. In FIGS. 1 and 2, a pedestrian 4 is recognized as the explicit risk target ER near the compartment line CL1 in the roadside zone. This pedestrian 4 is not a virtual pedestrian but a real pedestrian recognized by the autonomous sensor.

Around the explicit risk target ER, a predicted risk vector is generated with the explicit risk target ER as a base point. In the example shown in FIG. 1, a predicted risk vector RV01 located directly below the explicit risk target ER and a predicted risk vector RV02 extending from the explicit risk target ER in the lane inward direction are generated. In the example shown in FIG. 2, a predicted risk vector RV03 located directly below the explicit risk target ER and a predicted risk vector RV04 extending from the explicit risk target ER in the lane inward direction are generated. The predicted risk vectors RV01 and RV03 positioned directly below the explicit risk target ER are 0 vectors, and it is predicted that the explicit risk target ER will stop.

In FIGS. 1 and 2, the color density of each predicted risk vector indicates the level of the prediction accuracy of each predicted risk vector. The sum of the prediction accuracies of the predicted risk vectors generated from one explicit risk target ER is 100%. Therefore, in FIG. 1, the sum of the prediction accuracy of the predicted risk vector RV01 and the prediction accuracy of the predicted risk vector RV02 is 100%. In FIG. 2, the sum of the prediction accuracy of the predicted risk vector RV03 and the prediction accuracy of the predicted risk vector RV04 is 100%. In the present embodiment, the prediction accuracy of the predicted risk vector is any one of high, medium, and low, and in the drawings, the predicted risk vectors are displayed in a dark color in descending order of the prediction accuracy.

The direction, magnitude, and accuracy of the predicted risk vector is determined by the driver assistance system 100. In the case of the explicit risk avoidance control, the driver assistance system 100 extracts the risk target information related to the explicit risk target ER from the peripheral situation information of the vehicle 2 obtained by the autonomous sensor, and obtains the natural phenomenon information related to the natural phenomena IF01 and IF02. Other examples of the explicit risk target ER include a bicycle, a two wheeled vehicle, a parked vehicle, and the like that are present on a roadside zone. Still other examples of the explicit risk target ER include a bicycle, a two wheeled vehicle, a vehicle, and the like that travel on a lane. Specific example of the natural phenomenon that affects the explicit risk target ER will be described in examples of the explicit risk avoidance control described later.

The driver assistance system 100 determines a predicted risk vector based on the risk target information and the natural phenomenon information. When the explicit risk target ER is common, since there is no difference in the risk target information, a difference between the natural phenomena IF01 and IF02 causes a difference in the predicted risk vector. For example, the predicted risk vector RV04 shown in FIG. 2 extends longer in the lane inward direction than the predicted risk vector RV02 shown in FIG. 1, and has high prediction accuracy. This is because the natural phenomenon IF02 in FIG. 2 has a larger influence on the collision risk than the natural phenomenon IF01 in FIG. 1.

The driver assistance system 100 generates a target trajectory of the vehicle 2 based on the predicted risk vector. The target trajectory is a trajectory along which the vehicle 2 travels on the target route, and includes a set of target positions of the vehicle 2 in the vehicle coordinate system and a target speed at each target point. Typically, the target trajectory is generated such that the vehicle 2 travels at the center of the traveling lane at the legal speed.

In the example shown in FIG. 1, since the predicted risk vector RV02 is short and the prediction accuracy is low, the target trajectory TR01 may be slightly spread rightward in order to avoid the collision between the vehicle 2 and the explicit risk target ER. In the example shown in FIG. 2, the predicted risk vector RV04 extends to the middle of the lane in which the vehicle 2 is traveling, and the prediction accuracy is higher than that of the predicted risk vector RV02. Therefore, in the example shown in FIG. 2, the target trajectory RV04 is generated so as to largely detour the predicted risk vector TR02 to the right.

The driver assistance system 100 determines the manipulated variable of each actuator so that the vehicle 2 follows the target trajectory. Since the target trajectory is generated based on the predicted risk vector, causing the vehicle 2 to follow the target trajectory means that the manipulated variable of each actuator is determined so as to reduce the collision risk caused by the explicit risk target ER.

According to the explicit risk avoidance control, by determining the predicted risk vector based on not only the risk target information but also the natural phenomenon information, it is possible to make the intervention in the actuator operation performed to reduce the collision risk appropriate. As a result, it is possible to reduce the collision risk caused by the explicit risk target ER present in front of the vehicle 2 while suppressing annoyance and anxiety given to the driver.

1-3. Potential Risk Avoidance Control

Figure 3:
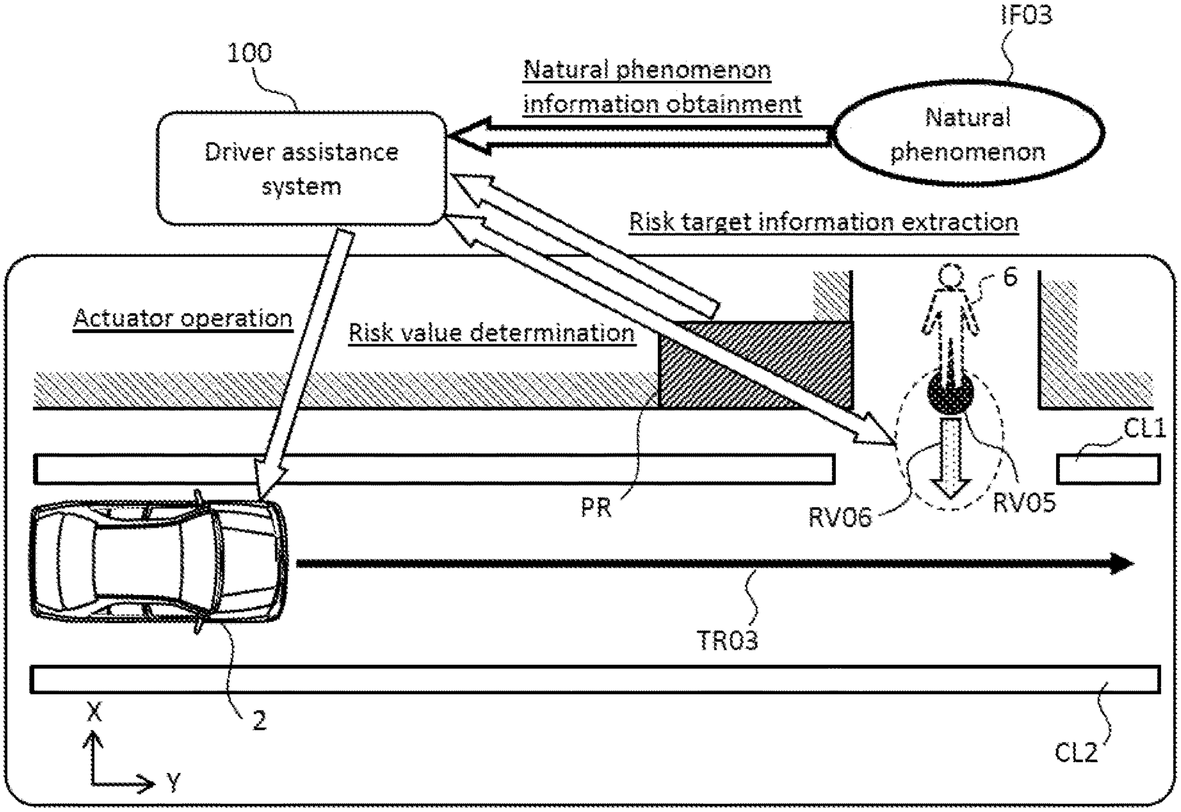
FIG. 3 is a conceptual diagram for explaining potential risk avoidance control in the driver assistance control by the driver assistance system according to the embodiment of the present disclosure.
Figure 4:
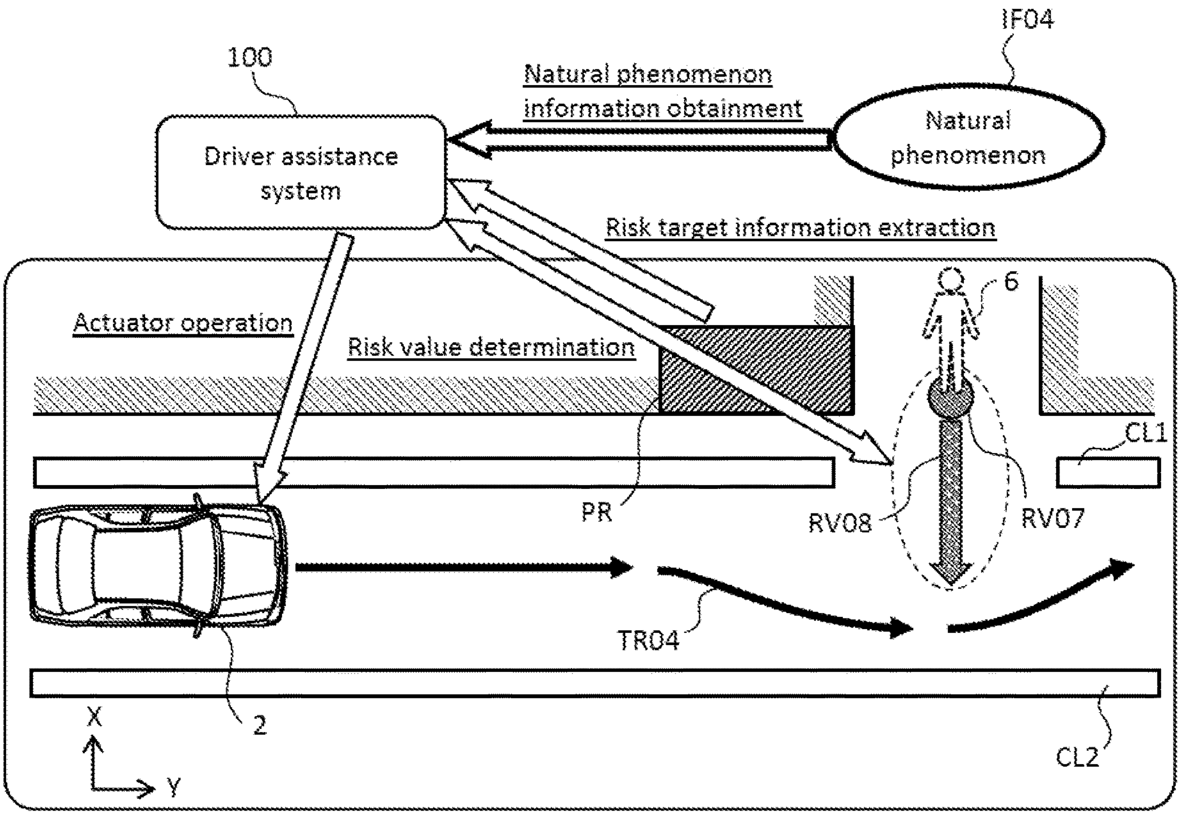
FIG. 4 is a conceptual diagram for explaining the potential risk avoidance control in the driver assistance control by the driver assistance system according to the embodiment of the present disclosure.

FIGS. 3 and 4 are conceptual diagrams for explaining potential risk avoidance control by the driver assistance system 100 according to the present embodiment. FIGS. 1 and 2 illustrate a state in which vehicle 2 is traveling in a traveling lane defined by two compartment lines CL1 and CL2. A sideway is connected to the right side of the traveling lane. The presence of the sideway can be obtained from map information. A building as a potential risk target PR is recognized in front of the side road. The potential risk target PR is defined as a target that is present in front of the vehicle 2 and creates a blind spot for the vehicle 2. More specifically, the area that is a blind spot for the vehicle 2 means an area that is a blind spot for the autonomous sensor mounted on the vehicle 2. The potential risk target PR itself may be recognized by the autonomous sensor.

The potential risk target PR creates a blind spot on the sideway that cannot be seen from the vehicle 2. In the potential risk avoidance control, it is assumed that a virtual pedestrian 6 exists behind the potential risk target PR. Then, a predicted risk vector is generated with the virtual pedestrian 6 as a base point. In the example shown in FIG. 3, a predicted risk vector RV05 located directly below the virtual pedestrian 6 and a predicted risk vector RV06 extending from the virtual pedestrian 6 in the lane inward direction are generated. In the example shown in FIG. 4, a predicted risk vector RV07 located directly below the virtual pedestrian 6 and a predicted risk vector RV08 extending from the virtual pedestrian 6 in the lane inward direction are generated. The predicted risk vectors RV06 and RV08 located directly below the virtual pedestrian 6 are 0 vectors, and the virtual pedestrian 6 is predicted to stop. The color density of each predicted risk vector in FIGS. 3 and 4 indicates the level of the prediction accuracy of each predicted risk vector.

The direction, magnitude, and accuracy of the predicted risk vector is determined by the driver assistance system 100. In the case of the potential risk avoidance control, the driver assistance system 100 extracts the risk target information related to the potential risk target PR from the peripheral situation information of the vehicle 2 obtained by the autonomous sensor, and obtains the natural phenomenon information related to the natural phenomena IF03 and IF04. Other examples of the potential risk target PR include a block fence and a wall that are present at a corner of an intersection or a T-shaped junction, and a parked vehicle that is present on a roadside zone.

The driver assistance system 100 determines a risk value based on the risk target information and the natural phenomenon information. When the potential risk target PR is common, since there is no difference in the risk target information, a difference between the natural phenomena IF03 and IF04 causes a difference in the predicted risk vector. For example, the predicted risk vector RV08 shown in FIG. 4 extends longer in the lane inward direction than the predicted risk vector RV06 shown in FIG. 3 and has a higher prediction accuracy. This is because the natural phenomenon IF04 in FIG. 4 has a larger influence on the collision risk than the natural phenomenon IF03 in FIG. 3.

The driver assistance system 100 generates a target trajectory of the vehicle 2 based on the predicted risk vector. In the example shown in FIG. 3, since the predicted risk vector RV06 is short and the prediction accuracy is low, the target trajectory RV06 can be generated so as not to interfere with the predicted risk vector TR03. In the example shown in FIG. 4, the predicted risk vector RV08 extends to the middle of the lane in which the vehicle 2 is traveling, and the prediction accuracy is higher than that of the predicted risk vector RV06. Therefore, in the example shown in FIG. 4, the target trajectory RV08 is generated so as to largely detour the predicted risk vector TR04 to the right side.

The driver assistance system 100 determines the manipulated variable of each actuator so that the vehicle 2 follows the target trajectory. Since the target trajectory is generated based on the predicted risk vector, causing the vehicle 2 to follow the target trajectory means that the manipulated variable of each actuator is determined so as to reduce the collision risk caused by the potential risk target PR.

According to the potential risk avoidance control, by determining the predicted risk vector based on not only the risk target information but also the natural phenomenon information, it is possible to make the intervention in the actuator operation performed to reduce the collision risk appropriate. As a result, it is possible to reduce the collision risk caused by the potential risk target PR existing in front of the vehicle 2 while suppressing annoyance and anxiety given to the driver.

2. Configuration and Function of Driver Assistance System

2-1. Configuration of Driver Assistance System

Figure 5:
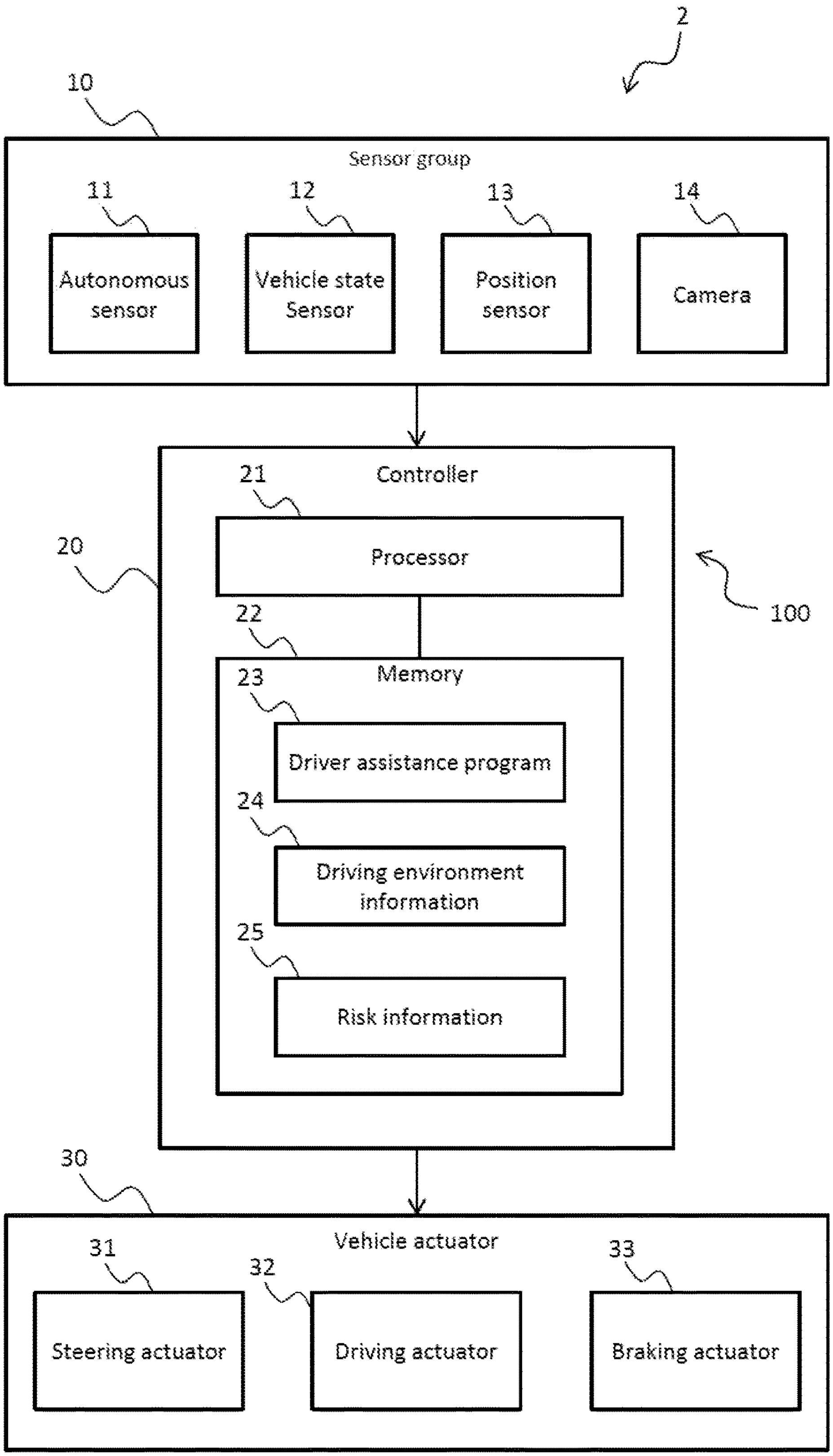
FIG. 5 is a block diagram showing an example of the driver assistance system according to the embodiment of the present disclosure and a vehicle to which the driver assistance system is applied.

FIG. 5 is a diagram illustrating a configuration example of the driver assistance system 100 according to the present embodiment and the vehicle 2 to which the driver assistance system 100 is applied. The vehicle 2 includes a controller 20 that controls the vehicle 2, a sensor group 10 that inputs information to the controller 20, and a vehicle actuator 30 that operates in response to a signal output from the controller 20. The controller 20 is connected to the sensor group 10 and the vehicle actuator 30 via an in-vehicle network. The driver assistance system 100 includes at least the controller 20. However, the driver assistance system 100 may include the sensor group 10 in addition to the controller 20. The driver assistance system 100 may further include the vehicle actuator 30.

The sensor group 10 includes an autonomous sensor 11, a vehicle state sensor 12, a position sensor 13, and a camera 14. The autonomous sensor 11 is a sensor that obtains information related to a peripheral situation of the vehicle including the area in front of the vehicle 2. The autonomous sensor 11 includes at least one of a camera, a millimeter wave radar, and a LiDAR (Laser Imaging Detection and Ranging). Based on the information obtained by the autonomous sensor 11, processing such as detection of an object present around the vehicle 2, measurement of a relative position and a relative speed of the detected object with respect to the vehicle 2, and recognition of a shape of the detected object is performed. The vehicle state sensor 12 is a sensor that obtains information related to the movement of the vehicle 2. The vehicle state sensor 12 includes, for example, at least one of a wheel speed sensor, an acceleration sensor, a yaw rate sensor, and a steering angle sensor. The position sensor 13 is used to obtain information related to the current position of the vehicle 2. As the position sensor 13, a GPS (Global Positioning System) receiver is exemplified. The camera 14 is used to recognize a natural phenomenon occurring around the vehicle 2. The natural phenomenon recognized by the camera 14 includes, for example, rain, snow, fog, and the direction of sunlight. Note that the camera 14 may also serve as the camera of the autonomous sensor 11.

The vehicle actuator 30 is an actuator that controls the movement of the vehicle 2. The vehicle actuator 30 includes a steering actuator 31 that steers the vehicle 2, a driving actuator 32 that drives the vehicle 2, and a braking actuator 33 that brakes the vehicle 2. The steering actuator 31 includes, for example, a power steering system, a steer-by-wire steering system, and a rear wheel steering system. The drive actuator 32 includes, for example, an engine, an EV system, and a hybrid system. The brake actuator 33 includes, for example, a hydraulic brake and an electric regenerative brake.

The controller 20 is an ECU (Electronic Control Unit) mounted on the vehicle 2 or an assembly of a plurality of ECUs. Alternatively, some or all of the functions of the controller 20 may be arranged in an external server. In this case, the vehicle 2 and the server are connected via a mobile communication network. In any case, the controller 20 comprises at least one processor 21 (hereinafter simply referred to as a processor) and at least one memory (hereinafter simply referred to as memory) 22 communicatively coupled to the processor 21. The memory 22 includes a program memory. The program memory is a computer-readable storage medium. The program memory stores a driver assistance program 23 including a plurality of instructions executable by the processor 21. The driver assistance program 23 is a program for causing the processor 21 to execute the driver assistance control described above. The memory 22 also stores driving environment information 24 and risk information 25 related to the driver assistance program 23.

2-2. Information Stored in Memory

The driving environment information 24 is information indicating a driving environment of the vehicle 2. The driving environment information 24 includes, for example, vehicle position information, vehicle state information, and map information. The vehicle position information is information indicating a position and a direction of the vehicle 2 obtained from a detection result by the position sensor 13. The vehicle state information is information such as a vehicle speed, a yaw rate, a lateral acceleration, and a steering angle obtained from a detection result by the vehicle state sensor 12. The map information includes, for example, a lane arrangement and a road shape. The controller 20 obtains map information of a necessary area from a map database. The map database may be stored in a predetermined memory mounted on the vehicle 2, or may be obtained from a server outside the vehicle 2.

The driving environment information 24 further includes peripheral situation information indicating a situation around the vehicle 2. The peripheral situation information includes information obtained by the autonomous sensor 11, for example, image information indicating a situation around the vehicle 2 captured by a camera and measurement information measured by a millimeter wave radar or a LiDAR.

The peripheral situation information further includes road configuration information. The road configuration information is information related to a relative position of a road configuration around the vehicle 2 with respect to the vehicle 2. The road configuration around the vehicle 2 includes compartment lines and road edge objects. The road edge object is a three-dimensional object indicating an edge of a road, and includes, for example, a curb, a guardrail, a wall, and a central separation zone. The relative positions of these road configurations can be obtained, for example, by analyzing image information obtained by a camera.

The peripheral situation information further includes target information. The target information is information related to a target around the vehicle 2. The target information includes a relative position and a relative speed of the target with respect to the vehicle 2. For example, the target can be identified by analyzing image information obtained by a camera, and the relative position of the target can be calculated. It is also possible to identify the target based on the radar measurement information and obtain the relative position and the relative speed of the target. The target information includes the size and the type of the recognized target. The target information may include a moving direction and a moving speed of the target. Further, the target information may include a history of the relative position, the relative speed, the moving direction, and the moving speed of the target during a certain period in the past. The target includes the above-described explicit risk target and potential risk target, and the target information includes the above-described risk target information.

The driving environment information 24 further includes natural phenomenon information. The natural phenomenon information is information related to a natural phenomenon that affects the collision risk of the vehicle 2. Examples of the natural phenomenon information include information on weather and information on backlight that occurs when the vehicle 2 is viewed from a risk target. The natural phenomenon information is stored in association with the risk target information.

The risk information 25 is information related to the predicted risk vector on a road on which the vehicle 2 travels and the prediction accuracy thereof. The predicted risk vector in a vehicle coordinate system or an absolute coordinate system and the prediction accuracy thereof are stored as the risk information 25. The predicted risk vector and the prediction accuracy are calculated by the processor 21 based on the risk target information and the natural phenomenon information.

2-3. Processing Executed by Processor

Figure 6:
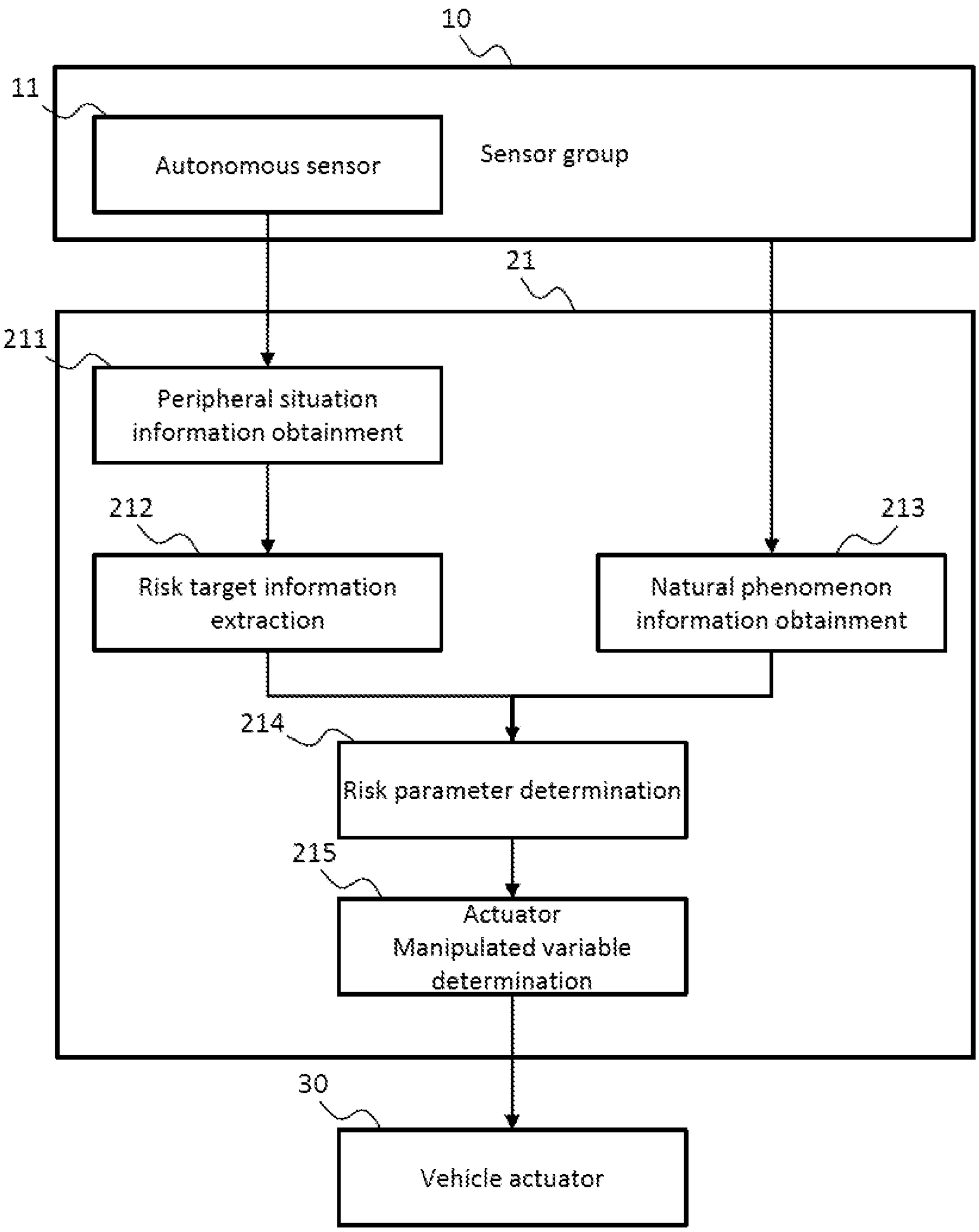
FIG. 6 is a block diagram illustrating processing performed by a processor according to the embodiment of the present disclosure.

FIG. 6 is a block diagram illustrating processing executed by the processor 21 when the driver assistance program 23 is executed. By executing the driver assistance program 23, the processor 21 executes a (peripheral situation information obtainment) process 211, a (risk target information extraction) process 212, a (natural phenomenon information obtainment) process 213, a (risk parameter determination) process 214, and a (actuator manipulated variable determination) process 215.

First, the processor 21 executes the process 211. By the process 211, peripheral situation information is obtained from the autonomous sensor 11. Strictly speaking, the peripheral situation information detected by the autonomous sensor 11 is temporarily stored in the memory 22, and the temporarily stored peripheral situation information is read out by the processor 21.

Next, the processor 21 executes the process 212. By the process 212, risk target information related to a risk target that causes a collision risk is extracted from target information included in the peripheral situation information. Whether or not a target existing in front of the vehicle 2 is a risk target is determined based on the relative position, the relative speed, the size, the type, and the like of the target. The risk target information is extracted from the peripheral situation information for all the risk targets existing in front of the vehicle 2.

The processor 21 executes the process 213 in parallel with the process 212. By the process 213, natural phenomenon information affecting the recognized risk target is obtained from the sensor group 10. When the risk target is an explicit risk target, the natural phenomenon affecting the risk target means a natural phenomenon affecting the visibility of the vehicle 2 from the explicit risk target itself. On the other hand, when the risk target is a potential risk target, the natural phenomenon affecting the risk target means a natural phenomenon affecting the visibility of the vehicle 2 from a virtual object hidden in a blind spot of the potential risk target. For each recognized risk target, the processor 21 obtains natural phenomenon information from the sensor group 10 for all natural phenomena that affect the risk target.

After executing the process 212 and the process 213, the processor 21 executes the process 214. By the process 214, a risk parameter that quantifies the collision risk, that is, a predicted risk vector and prediction accuracy thereof is determined based on the risk target information and the natural phenomenon information. The processor 21 calculates a basic risk vector and a basic accuracy of the predicted risk vector based on the risk target information. Next, the processor 21 corrects the magnitude of the predicted risk vector and the prediction accuracy from the basic values based on the natural phenomenon information. For example, if the natural phenomenon affects so as to increase the collision risk in the lateral direction (X direction in FIG. 1) of the vehicle 2, the processor 21 increases the magnitude of the predicted risk vector in the lateral direction and increases the prediction accuracy thereof.

After execution of the process 214, the processor 21 executes the process 215. In the process 215, an actuator manipulated variable is determined based on the predicted risk vector and the predicted accuracy determined in the process 214. Specifically, a target trajectory with a small collision risk is generated based on the predicted risk vector and the predicted accuracy, and an actuator manipulated variable for causing the vehicle 2 to follow the target trajectory is determined. The processor 21 operates the vehicle actuator 30 according to the actuator manipulated variable determined in the process 215. The steering of the vehicle 2 is controlled by the operation of the steering actuator 31 by the processor 21. The driving of the vehicle 2 is controlled by the operation of the driving actuator 32 by the processor 21. The braking of the vehicle 2 is controlled by the operation of the braking actuator 33 by the processor 21.

2-4. Specific Example of Risk Parameter Determination Process

Figure 7:
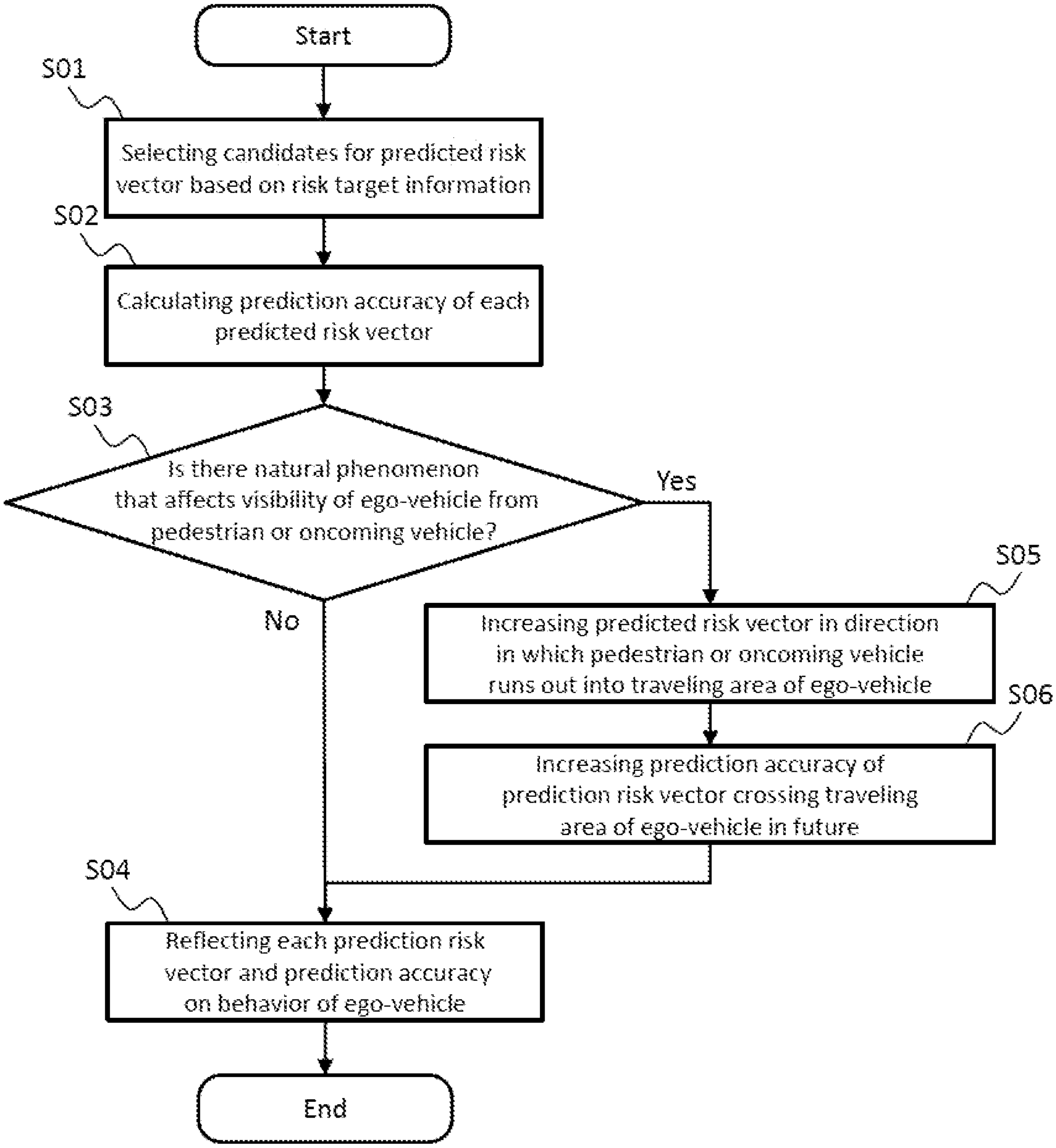
FIG. 7 is a flowchart illustrating a risk parameter determination process executed by the processor according to the embodiment of the present disclosure.

FIG. 7 is a flowchart illustrating an example of the process 214 for determining the risk parameter performed by the processor 21. In the process 214, the processor 21 executes step S01, step S02, step S03, step S04, step S05, and step S06.

In step S01, the processor 21 lists candidates for the predicted risk vector based on the risk target information. Each predicted risk vector mentioned here is a basic risk vector in which natural phenomenon information is not taken into consideration. In step S02, the processor 21 calculates for each predicted risk vector its prediction accuracy. The prediction accuracy calculated here is a basic accuracy in which natural phenomenon information is not taken into consideration.

Next, in step S03, the processor 21 determines whether or not a natural phenomenon that affects the visibility of the vehicle 2 from a pedestrian or an oncoming vehicle has occurred based on the natural phenomenon information. Note that the pedestrian and the oncoming vehicle mentioned here are examples of the explicit risk target or examples of the virtual object hiding in the blind spot of the potential risk target. When the above-described natural phenomenon does not occur, the processing by the processor 21 proceeds to step S04. When the above-described natural phenomenon occurs, the processing by the processor 21 proceeds to step S04 via steps S05 and S06.

In step S05, the processor 21 increases the run-out speed in the case where it is assumed that a pedestrian or an oncoming vehicle run out into the traveling area of the vehicle 2. That is, among the predicted risk vectors, the predicted risk vector heading toward the traveling lane of the vehicle 2 is increased in the magnitude thereof. In step S06, the processor 21 increases the prediction accuracy of the predicted risk vector increased in step S06, i.e., the predicted risk vector that will intersect the travel area of the vehicle 2 in the future.

In step S04, the processor 21 reflects the predicted risk vectors and their prediction accuracies determined as described above on the behavior of the vehicle 2. That is, it is reflected in the determination of the actuator manipulated variable in the process 215.

3. Example of Driver Assistance Control 3-1. First Example

Figure 8:
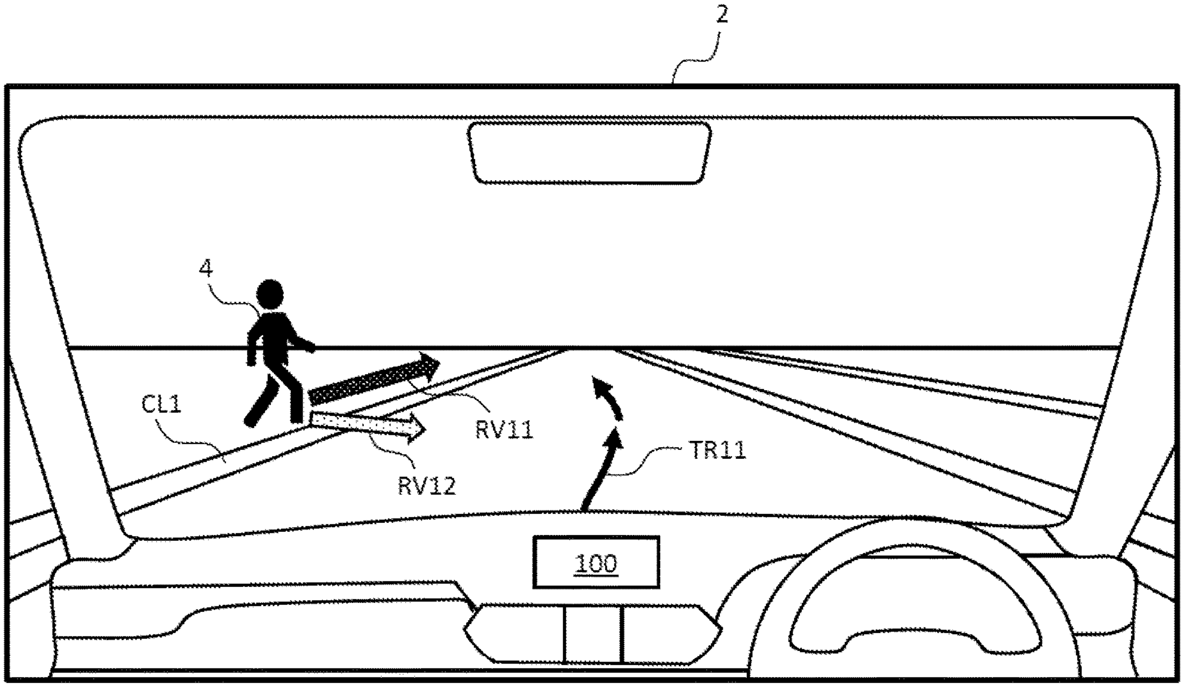
FIG. 8 is a conceptual diagram for explaining a first example of the driver assistance control by the driver assistance system according to the embodiment of the present disclosure.
Figure 9:
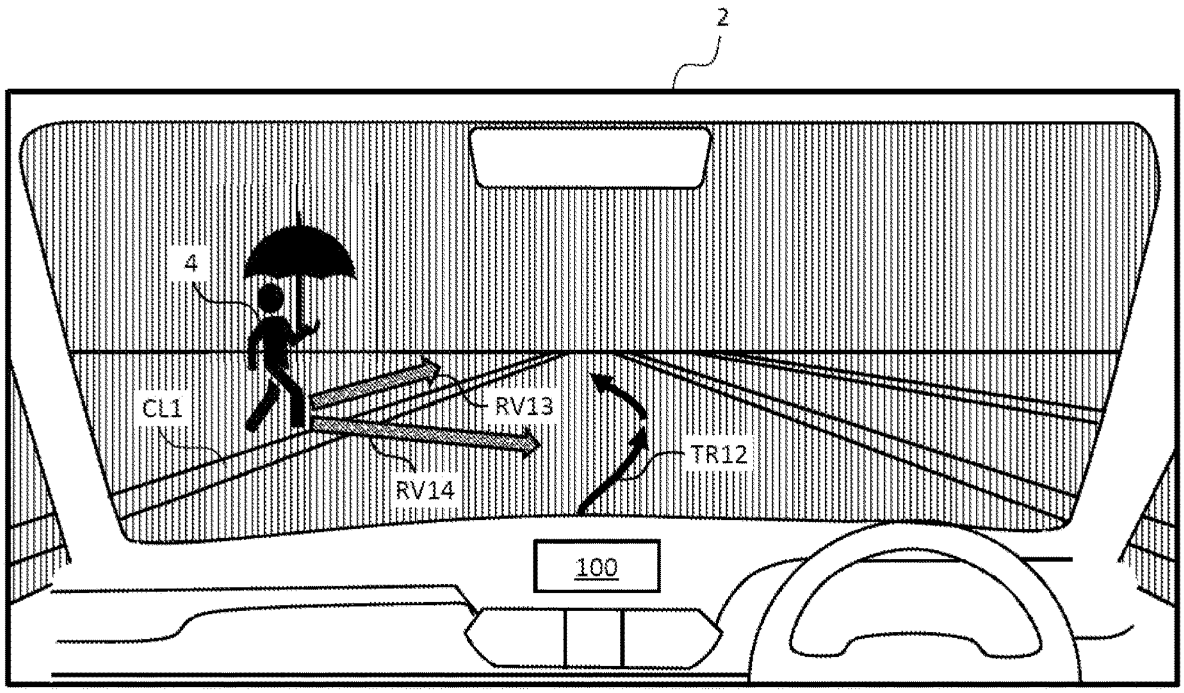
FIG. 9 is a conceptual diagram for explaining the first example of the driver assistance control by the driver assistance system according to the embodiment of the present disclosure.

FIGS. 8 and 9 are conceptual diagrams for explaining a first example of the driver assistance control by the driver assistance system 100. The first example of the driver assistance control is an example of the explicit risk avoidance control. In each of FIGS. 8 and 9, a view seen ahead from the inside of the vehicle 2 is depicted. In the first embodiment, the pedestrian 4 is walking on the road side outside the left compartment line CL1. The driver assistance system 100 recognizes the pedestrian 4 that is present in front of the vehicle 2 and may collide with the vehicle 2 as an explicit risk target. The driver assistance system 100 extracts the target information related to the pedestrian 4, which is the explicit risk target, from the peripheral situation information as the risk target information.

The collision risk caused by the pedestrian 4 is a risk that the pedestrian 4 crosses the compartment line CL1 and runs out into the traveling lane in which the vehicle 2 is traveling, so that the vehicle 2 collides with the pedestrian 4. This collision risk depends on natural phenomena. The natural phenomenon in the first example is weather.

In the example shown in FIG. 8, the weather is sunny or cloudy. The driver assistance system 100 generates a predicted risk vector RV11 in a direction parallel to the compartment line CL1 and a predicted risk vector RV12 directed into the traveling lane in which the vehicle 2 is traveling with respect to the pedestrian 4 as the explicit risk target. Both the predicted risk vector RV11 and the predicted risk vector RV12 are basic risk vectors that are not corrected by natural phenomenon information. The predicted risk vector RV11 is a vector in the direction in which the pedestrian 4 is currently walking, and is generated based on the moving speed of the pedestrian 4. The predicted risk vector RV12 is a vector in a case where it is assumed that the pedestrian 4 suddenly runs out into the traveling lane.

Since the visibility of the vehicle 2 from the pedestrian 4 is good on a sunny day and a cloudy day, the possibility that the pedestrian 4 runs out into the traveling lane without being aware of the vehicle 2 is low. Therefore, when the weather is fine or cloudy, the predicted risk vector RV12 heading in the traveling lane is calculated to be small and the prediction accuracy thereof is calculated to be low. The driver assistance system 100 generates a target trajectory TR11 slightly spreading rightward from the center so as to avoid the predicted risk vector RV12 extending in the traveling lane. The driver assistance system 100 determines the manipulated variable of the actuator such that the vehicle 2 follows the target trajectory TR11.

In the example shown in FIG. 9, the weather is rain. The driver assistance system 100 generates a predicted risk vector RV13 in a direction parallel to the compartment line CL1 and a predicted risk vector RV14 directed into the traveling lane in which the vehicle 2 is traveling with respect to the pedestrian 4 as the explicit risk target. The predicted risk vector RV13 is a vector in a direction in which the pedestrian 4 is currently walking, and the predicted risk vector RV14 is a vector in a case where it is assumed that the pedestrian 4 suddenly runs out into the traveling lane.

Rain is a natural phenomenon affecting the pedestrian 4. On a rainy day, the visibility of the vehicle 2 from the pedestrian 4 is deteriorated due to rain or an umbrella. Therefore, the possibility that the pedestrian 4 runs out into the traveling lane without being aware of the vehicle 2 increases. Therefore, when it is raining, the predicted risk vector RV14 heading into the traveling lane is made larger than the predicted risk vector RV12 on a sunny day or a cloudy day, and the prediction accuracy thereof is calculated to be large. The driver assistance system 100 generates a target trajectory TR12 that largely detours the predicted risk vector RV14 extending to the middle of the traveling lane to the right. The driver assistance system 100 determines the manipulated variable of the actuator such that the vehicle 2 follows the target trajectory TR12.

In the first example, rain is exemplified as the natural phenomenon affecting the pedestrian, but snow and fog are also included in the natural phenomenon affecting the pedestrian. When snow falls or fog occurs, the visibility of the ego-vehicle from a pedestrian deteriorates. Therefore, even when snow falls or fog occurs, the predicted risk vector directed from the pedestrian into the traveling lane is increased, and the prediction accuracy thereof is calculated to be large. Further, the fact that the visibility of the ego-vehicle deteriorates on a rainy day, snowy day, and foggy day also applies to explicit risk targets other than pedestrians, such as oncoming vehicles and bicycles.

3-2. Second Example

Figure 10:
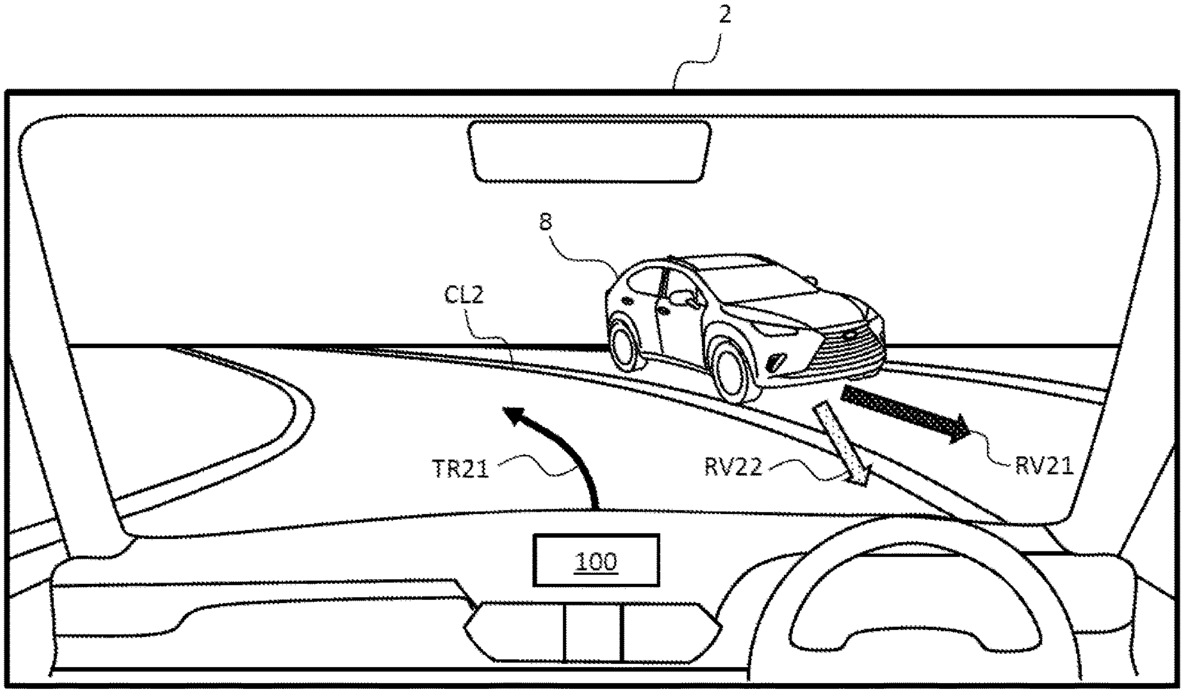
FIG. 10 is a conceptual diagram for explaining a second example of the driver assistance control by the driver assistance system according to the embodiment of the present disclosure.
Figure 11:
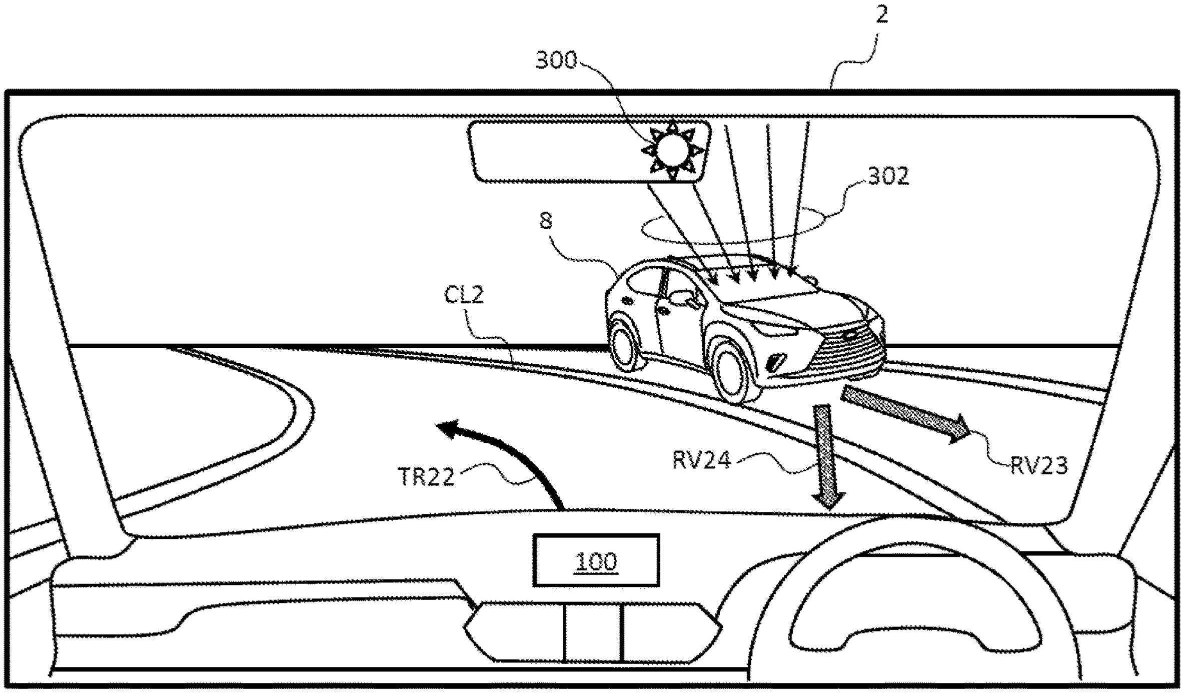
FIG. 11 is a conceptual diagram for explaining the second example of the driver assistance control by the driver assistance system according to the embodiment of the present disclosure.

FIGS. 10 and 11 are conceptual diagrams for explaining a second example of the driver assistance control by the driver assistance system 100. The second example of the driver assistance control is an example of the explicit risk avoidance control. In each of FIGS. 10 and 11, a view seen ahead from the inside of the vehicle 2 is depicted. In the second embodiment, an oncoming vehicle 8 is traveling in an adjacent lane. The driver assistance system 100 recognizes the oncoming vehicle 8 which is present in front of the vehicle 2 and which may collide with the vehicle 2 as an explicit risk target. The driver assistance system 100 extracts target information related to the oncoming vehicle 8, which is an explicit risk target, from the peripheral situation information as risk target information.

The collision risk caused by the oncoming vehicle 8 is a risk that the oncoming vehicle 8 crosses the compartment line CL2 and runs out into the traveling lane in which the vehicle 2 is traveling, so that the vehicle 2 collide with the oncoming vehicle 8. This collision risk depends on natural phenomena. The natural phenomenon in the second example is backlight that occurs when the vehicle 2 is viewed from the oncoming vehicle 8.

In the example shown in FIG. 10, the sun is not located in the direction of the vehicle 2 when viewed from the oncoming vehicle 8. The driver assistance system 100 generates a predicted risk vector RV21 in a direction along the adjacent lane in which the oncoming vehicle 8 is traveling and a predicted risk vector RV22 toward the inside of the traveling lane in which the vehicle 2 is traveling, with respect to the oncoming vehicle 8 which is the explicit risk target. Both the predicted risk vector RV21 and the predicted risk vector RV22 are basic risk vectors that are not corrected by natural phenomenon information. The predicted risk vector RV21 is a vector in the direction in which the oncoming vehicle 8 is currently moving, and is generated based on the moving speed of the oncoming vehicle 8. The predicted risk vector RV22 is a vector in a case where it is assumed that the oncoming vehicle 8 enters the traveling lane.

If the sun is not positioned in the direction of the vehicle 2 when viewed from the oncoming vehicle 8, a backlight state does not occur for the oncoming vehicle 8. Since the visibility of the vehicle 2 from the oncoming vehicle 8 is good in this case, the possibility that the oncoming vehicle 8 enters the traveling lane without being aware of the vehicle 2 is low. Therefore, when the backlight state does not occur for the oncoming vehicle 8, the predicted risk vector RV22 heading into the traveling lane is calculated to be small and the prediction accuracy thereof is calculated to be low. The driver assistance system 100 generates a target trajectory TR21 that passes slightly on the left side of the center so as to avoid the predicted risk vector RV21 that slightly enters the traveling lane. The driver assistance system 100 determines the manipulated variable of the actuator such that the vehicle 2 follows the target trajectory TR21.

In the example shown in FIG. 11, the sun 300 is located at a position reflected in the rearview mirror of the vehicle 2, that is, in the direction of the vehicle 2 when viewed from the oncoming vehicle 8. The driver assistance system 100 generates a predicted risk vector RV23 in a direction along the adjacent lane in which the oncoming vehicle 8 is traveling and a predicted risk vector RV24 toward the inside of the traveling lane in which the vehicle 2 is traveling, with respect to the oncoming vehicle 8 which is the explicit risk target. The predicted risk vector RV23 is a vector in a direction in which the oncoming vehicle 8 is currently moving, and the predicted risk vector RV24 is a vector in a case where it is assumed that the oncoming vehicle 8 enters the traveling lane.

When the sun is located in the direction of the vehicle 2 when viewed from the oncoming vehicle 8, sunlight 302 is incident on the windshield of the oncoming vehicle 8 from the direction of the vehicle 2. In other words, a backlight state occurs for the oncoming vehicle 8. The backlight is a natural phenomenon that affects oncoming vehicles 8. When the backlight state occurs for the oncoming vehicle 8, the visibility of the vehicle 2 from the oncoming vehicle 8 deteriorates. Therefore, the possibility that the oncoming vehicle 8 enters the traveling lane without being aware of the vehicle 2 increases. Therefore, when the backlight state occurs for the oncoming vehicle 8, the predicted risk vector RV24 heading toward the traveling lane is made larger than the predicted risk vector RV22 when the backlight state does not occur for the oncoming vehicle 8, and the prediction accuracy thereof is calculated to be larger. The driver assistance system 100 generates a target trajectory TR22 that largely detours the predicted risk vector RV24 largely entering the traveling lane to the left. The driver assistance system 100 determines the manipulated variable of the actuator such that the vehicle 2 follows the target trajectory TR22.

In the second example, an oncoming vehicle is exemplified as the explicit risk target. However, even for a pedestrian, the backlight becomes a factor that deteriorates visibility of the ego-vehicle. Therefore, even when the backlight state occurs for the pedestrian, the predicted risk vector directed from the pedestrian into the traveling lane is increased and the prediction accuracy thereof is calculated to be high.

4. Other Embodiments

The risk parameter can also be given as a distribution of risk values in the vehicle coordinate system or the absolute coordinate system. This distribution of risk values is defined as a risk potential field. Typically, the risk value is defined according to information related to a target object to avoid collision, such as a position of the target object, a distance from the target object, a type of the target object, a size of the target object, and a displacement speed of the target object. The vehicle coordinate system and the absolute coordinate system can be converted into each other.

Figure 12:
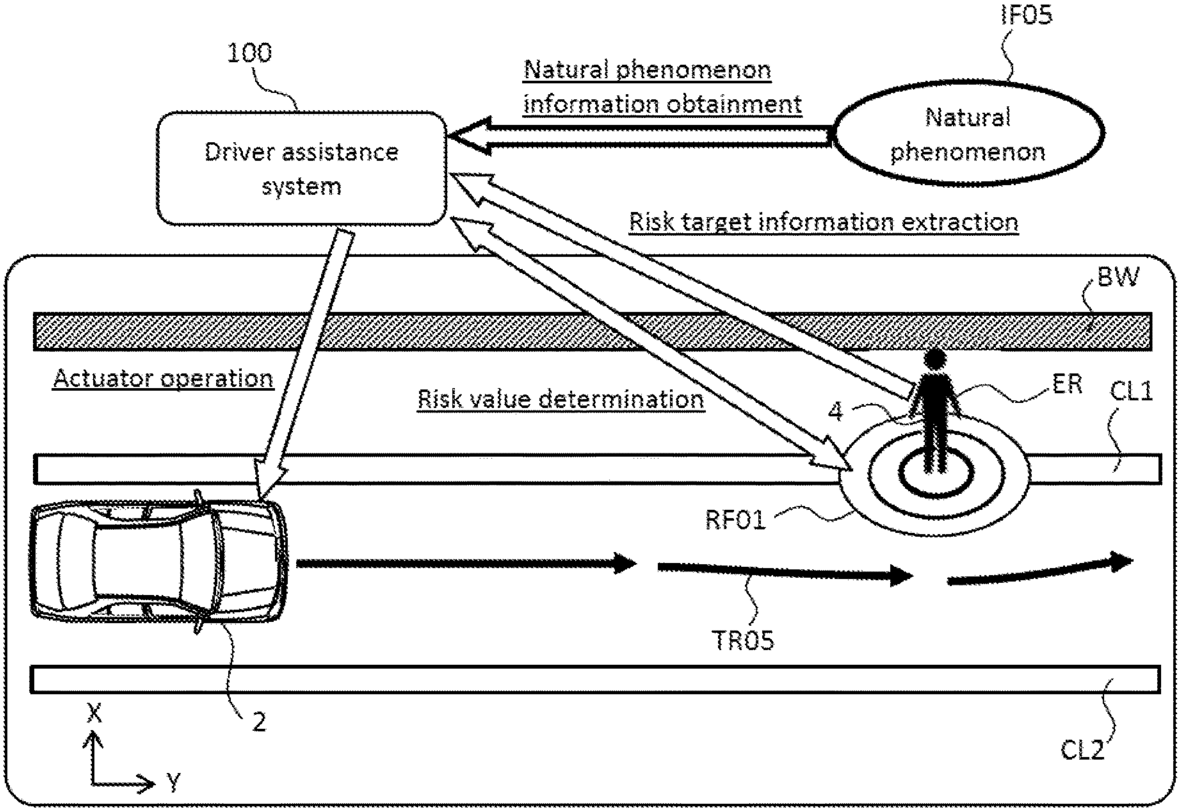
FIG. 12 is a conceptual diagram for explaining a modified example of the method for calculating the risk parameter.

For example, as shown in FIG. 12, a risk potential field RF01 is generated around the pedestrian 4 who is an explicit risk target ER. The risk potential field RF01 can be represented by a contour line obtained by connecting a set of points having the same risk value. In these examples, a contour line closer to the center has a higher risk value, and a contour line farther from the center has a lower risk value. The risk value of each position forming the risk potential field RF01 is determined by the driver assistance system 100.

In the case of the explicit risk avoidance control, the driver assistance system 100 extracts risk target information related to the explicit risk target ER from peripheral situation information of the vehicle 2 obtained by the autonomous sensor, and obtains natural phenomenon information which is information related to a natural phenomenon IF05. The driver assistance system 100 determines a risk value based on the risk target information and the natural phenomenon information. The distribution of the determined risk values is the risk potential field RF01.

Figure 13:
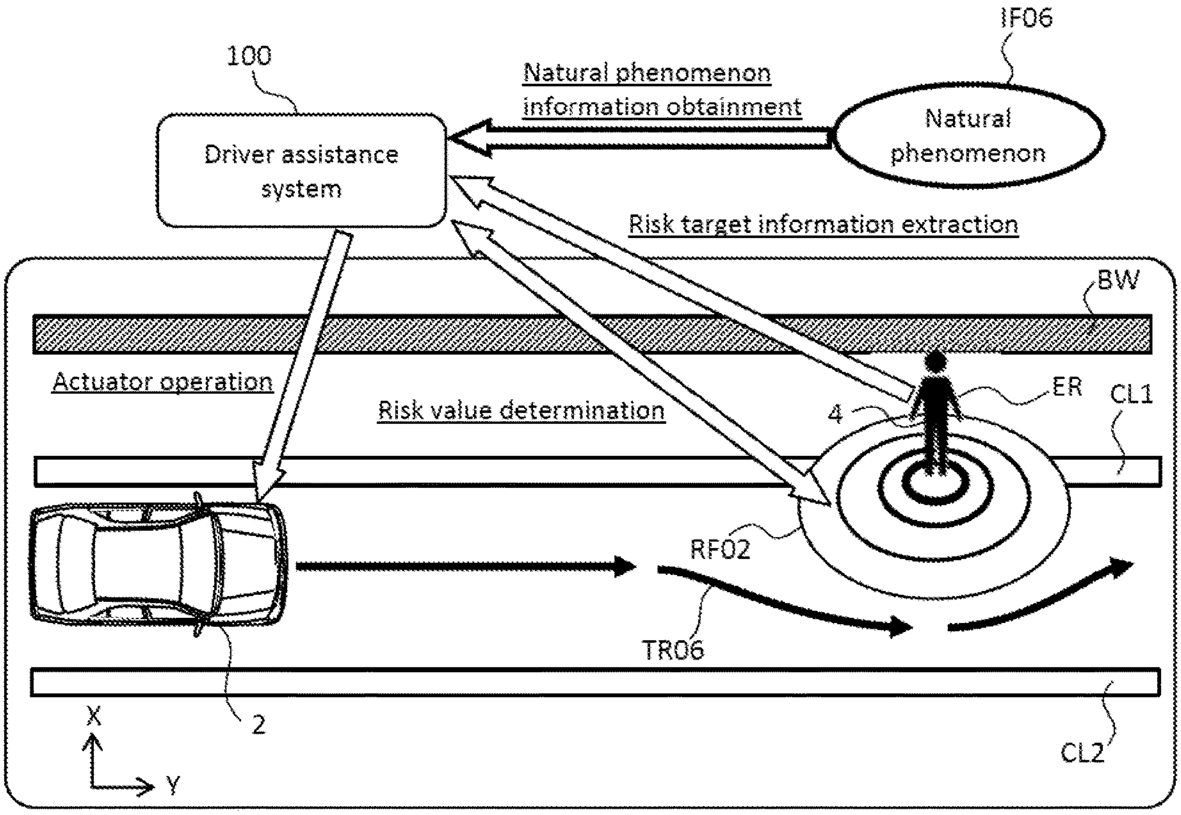
FIG. 13 is a conceptual diagram for explaining the modified example of the method for calculating the risk parameter.

When the explicit risk target ER is common, since there is no difference in the risk target information, a difference in the natural phenomenon information causes a difference in the magnitude of the risk potential field. For example, a risk potential field RF02 shown in FIG. 13 is wider than the risk potential field RF01 shown in FIG. 12. This is because a natural phenomenon IF06 in FIG. 13 has a larger influence on the collision risk than the natural phenomenon IF05 in FIG. 12.

The driver assistance system 100 generates a target trajectory of the vehicle 2 based on the risk potential field. In the example shown in FIG. 12, since the risk potential field RF01 is narrow, in order to prevent the target trajectory TR05 from interfering with the risk potential field RF01, the target trajectory TR05 may be slightly expanded to the right. In the example shown in FIG. 13, the risk potential field RF02 widely extends to the middle of the traveling lane in which the vehicle 2 is traveling. Therefore, in the example shown in FIG. 13, the target trajectory TR06 is generated so as to largely bypass the risk potential field RF02 to the right.

The above-described risk avoidance control using the risk potential field can be used not only for the explicit risk avoidance control but also for the potential risk avoidance control.

What is claimed is:

1. A driver assistance system comprising:
at least one processor; and
a program memory communicatively coupled to the at least one processor, the program memory storing a plurality of executable instructions configured to cause the at least one processor to:
extract risk target information related to a potential risk target that is present in front of a vehicle and creates a blind spot for the vehicle from information related to a peripheral situation of the vehicle;
obtain natural phenomenon information related to a natural phenomenon that affects visibility of the vehicle from a pedestrian hiding in the blind spot of the potential risk target;
determine a risk parameter that quantifies a collision risk such that the collision risk increases as the visibility worsens, based on the risk target information and the natural phenomenon information;
determine a manipulated variable of an actuator for controlling movement of the vehicle to reduce the collision risk based on the risk parameter;
control the movement of the vehicle, in response to determining the manipulated variable of the actuator, to follow a trajectory;
display candidates for a predicted risk vector based on the risk target information, including displaying the predicted risk vector below the pedestrian hiding in the blind spot, and displaying a color density of the predicted risk vector that indicates a prediction accuracy for each predicted risk vector; and calculate the prediction accuracy for each predicted risk vector in which the natural phenomenon information is not taken into consideration.

2. The driver assistance system according to claim 1, wherein the obtaining the natural phenomenon information comprises obtaining information related to weather.

3. The driver assistance system according to claim 1, wherein the at least one processor is further configured to generate a target trajectory of the vehicle based on the predicted risk vector, the target trajectory including the trajectory along which the vehicle travels on and includes a set of target positions of the vehicle and a target speed at each target point.

4. The driver assistance system according to claim 1, wherein the at least one processor is further configured to increase a run-out speed in a case that a pedestrian or an oncoming vehicle run out into a traveling area of the vehicle by increasing a magnitude of the predicted risk vector heading toward a traveling lane of the vehicle.

5. The driver assistance system according to claim 1, wherein the at least one processor is further configured to display each predicted risk vector in a descending order of the prediction accuracy.

6. A driver assistance method comprising:

extracting risk target information related to a potential risk target that is present in front of a vehicle and creates a blind spot for the vehicle from information related to a peripheral situation of the vehicle;

obtaining natural phenomenon information related to a natural phenomenon that affects visibility of the vehicle from a pedestrian hiding in the blind spot of the potential risk target;

determining a risk parameter that quantifies a collision risk such that the collision risk increases as the visibility worsens, based on the risk target information and the natural phenomenon information;

determining a manipulated variable of an actuator for controlling movement of the vehicle to reduce the collision risk based on the risk parameter;

controlling the movement of the vehicle, in response to determining the manipulated variable of the actuator, to follow a trajectory;

displaying candidates for a predicted risk vector based on the risk target information including displaying the predicted risk vector below the pedestrian hiding in the blind spot, and displaying a color density of the predicted risk vector that indicates a prediction accuracy for each predicted risk vector; and calculating the prediction accuracy for each predicted risk vector in which the natural phenomenon information is not taken into consideration.

7. The driver assistance method according to claim 6, wherein the obtaining the natural phenomenon information comprises obtaining information related to weather.

8. A non-transitory computer-readable storage medium storing a driver assistance program configured to cause a computer to execute processing, the processing comprising:

extracting risk target information related to a potential risk target that is present in front of a vehicle and creates a blind spot for the vehicle from information related to a peripheral situation of the vehicle;

obtaining natural phenomenon information related to a natural phenomenon that affects visibility of the vehicle from a pedestrian hiding in the blind spot of the potential risk target;

determining a risk parameter that quantifies a collision risk such that the collision risk increases as the visibility worsens, based on the risk target information and the natural phenomenon information;

determining a manipulated variable of an actuator for controlling movement of the vehicle to reduce the collision risk based on the risk parameter;

controlling the movement of the vehicle, in response to determining the manipulated variable of the actuator, to follow a trajectory;

displaying candidates for a predicted risk vector based on the risk target information including displaying the predicted risk vector below the pedestrian hiding in the blind spot, and displaying a color density of the predicted risk vector that indicates a prediction accuracy for each predicted risk vector; and calculating the prediction accuracy for each predicted risk vector in which the natural phenomenon information is not taken into consideration.

9. The non-transitory computer-readable storage medium according to claim 8, wherein the obtaining the natural phenomenon information comprises obtaining information related to weather.

* * * * *